United States Patent [19]

Ackeret

[11] Patent Number: 5,823,410
[45] Date of Patent: Oct. 20, 1998

[54] HOLDING DEVICE FOR LIQUID CONTAINERS, ESPECIALLY FOR INSTALLATION IN MOTOR VEHICLES

[75] Inventor: Peter Ackeret, Allmendstr., Switzerland

[73] Assignee: fischerwerke, Arthur Fischer GmbH & Co. KG, Waldachtal, Germany

[21] Appl. No.: 693,150
[22] PCT Filed: Jan. 31, 1995
[86] PCT No.: PCT/EP95/00329
§ 371 Date: Aug. 9, 1996
§ 102(e) Date: Aug. 9, 1996
[87] PCT Pub. No.: WO95/21750
PCT Pub. Date: Aug. 17, 1995

[30] Foreign Application Priority Data

Feb. 15, 1994 [CH] Switzerland ............................. 457/94

[51] Int. Cl.$^6$ ...................................................... B60N 3/10
[52] U.S. Cl. ........................................... 224/281; 224/926
[58] Field of Search ................................. 224/281, 926; 248/311.2

[56] References Cited

U.S. PATENT DOCUMENTS

| 2,926,879 | 3/1960 | Dietrich | 224/926 |
| 4,511,072 | 4/1985 | Owens | 224/926 |
| 4,792,174 | 12/1988 | Shioda | 224/926 |
| 5,167,392 | 12/1992 | Henricksen | 248/311.2 |
| 5,379,978 | 1/1995 | Patel et al. | 224/281 X |

FOREIGN PATENT DOCUMENTS

| 109754 | 4/1990 | Japan | 224/281 |
| 50039 | 3/1991 | Japan | 224/281 |
| 404090938 | 3/1992 | Japan | 224/281 |

Primary Examiner—Renee S. Luebke
Attorney, Agent, or Firm—Michael J. Striker

[57] ABSTRACT

A holding device for liquid containers to be installed in motor vehicles has a holder adapted to support a liquid container at its circumferential surface, a drip tray for collecting spilled liquid and adapted to be arranged under the liquid container and movably joined to the holder, and a protective housing. The holder and the drip tray are movable between an inner locked position in which the holder and the drip tray are enclosed, nested into one another, in the protective housing, and an outer locked position in which the holder and the drip tray are sufficiently far apart to enable the liquid container to be placed in the holder.

27 Claims, 5 Drawing Sheets

HOLDING DEVICE FOR LIQUID CONTAINERS, ESPECIALLY FOR INSTALLATION IN MOTOR VEHICLES

BACKGROUND OF THE INVENTION

Different versions of holding devices for liquids containers for use in motor vehicles are commercially available. Often, such devices are built into the motor vehicle by the manufacturer directly. Preferred constructions are those which, when not in use, are housed in the dashboard, in the central console or in an arm rest, and which can be moved by the user, as required, from this storage position into a position of use, in which drinks cans or drinking cups can be placed in the device.

In order to hold the liquids containers steady, in these known models they are supported in the holding device firstly at their bottom surfaces and additionally, at the greatest possible vertical distance therefrom, are supported by means of a ring-shaped holder at their circumferential surfaces.

In order to make sure that such relatively bulky holding devices take up as little space as possible for storage when they are not in use, they are generally composed of several moving parts which can be folded up to occupy a substantially smaller volume as the holding device is pushed into a protective housing arranged in the motor vehicle.

Because of this construction, the holding devices are restricted to the absolutely necessary elements, which support the liquids containers merely by point-contact whilst the main part of the containers is suspended "freely in space".

There is consequently a risk that liquids, which spill over out the liquids containers as a result of vibrations or accelerations, will be able to flow unchecked over the interior furnishings of the motor vehicle.

Holding devices which are supposed to compensate for sloping positions of the liquids containers by gimbal mountings, thus preventing spilling of liquids, are commercially available. But the construction of such devices is very complicated and unwieldy and is therefore unsuited for storage in a space-saving manner in a protective housing. Such devices also provide no effective protection when liquids spill over as the liquids containers are set down in the holding device or taken up therefrom.

SUMMARY OF THE INVENTION

The problem underlying the invention is to provide a holding device for liquids containers, especially for installation in motor vehicles, which is housed in the storage position in a space-saving manner in a protective housing and is constructed so that liquid which spills over from an inserted liquids container is caught in the holding device and is not able to flow over the interior furnishings of the motor vehicle.

The features provided according to the invention solve this problem.

By means of the drip tray located beneath the holder, it is possible to ensure that liquid which spills over from the cans or cups placed in the holder because of vibrations, accelerations or the manner of handling the containers is caught in the holding device, and is not able to flow over the interior furnishings of the motor vehicle.

For space-saving housing when not in use, the holder and the drip tray can be nested into one another, thereby approximately halving the volume.

The movement apart of holder and drip tray as they are moved out of the protective housing frees the holder so that a liquids container can be inserted from above and is supported at its circumferential surface by the holder and at its bottom surface by the drip tray.

The drip tray can be movably joined directly or by way of a carrier to the holder. The latter option provides the advantage that the drip tray can be removed from the holding device for cleaning purposes. This could be effected, for example, by folding the holder upwards or by pulling the drip tray out forwards.

In a preferred construction, the holder moves out of the protective housing whilst the drip tray is lowered beneath the holder. It would, of course, also be possible, in kinematic reversal, for the drip tray to move out of the housing and the holder to move upwards out of the drip tray.

The movement apart of the holder and drip tray could be effected by spring force, and the nesting together thereof as they are inserted into the protective housing could be effected by means of a control cam, for example on the housing.

The ejection of holder and drip tray from the protective housing could equally be effected by spring force, but then a manually releasable locking mechanism that would lock the holder and the drip tray in the protective housing would have to be provided.

The supports arranged on the holder for the liquids containers are preferably in the form of ring-shaped openings, in which the liquids container can be placed from above. The surface of the holder preferably slopes in such a manner that liquid that has spilled over passes through this ring, or other apertures in the holder, into the drip tray.

The holding device can be designed to receive one or more liquids containers standing behind one another and/or side by side.

BRIEF DESCRIPTION OF THE DRAWINGS

Further features and advantages of the invention are explained in greater detail hereinafter with reference to the accompanying drawings, in which.

DESCRIPTION OF PREFERRED EMBODIMENTS

Figure 1:
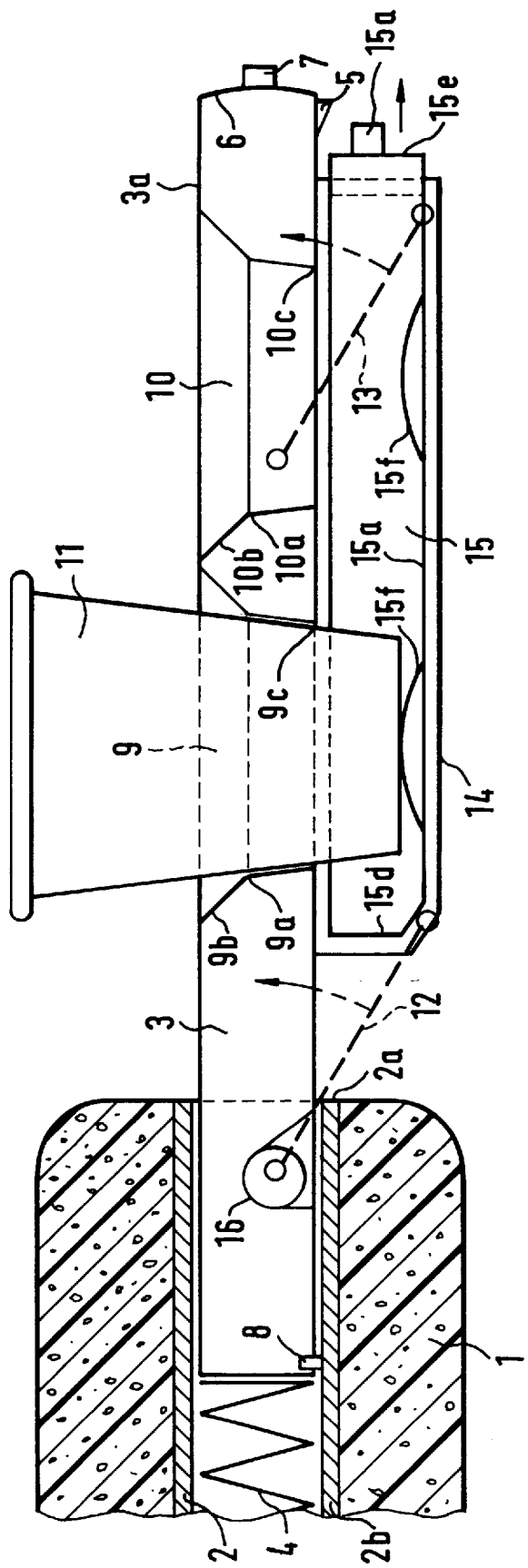
FIG. 1 shows a longitudinal section through a first embodiment of the holding device in the outer locked position, with a liquids container placed therein.
Figure 2:
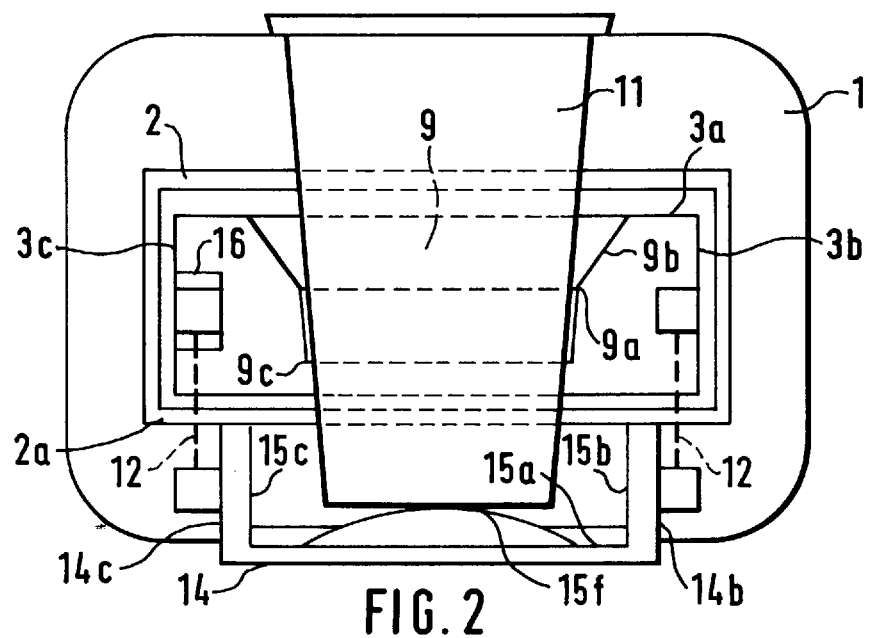
FIG. 2 shows a transverse section through the holding device according to the embodiment of FIG. 1, in the outer locked position.
Figure 4:
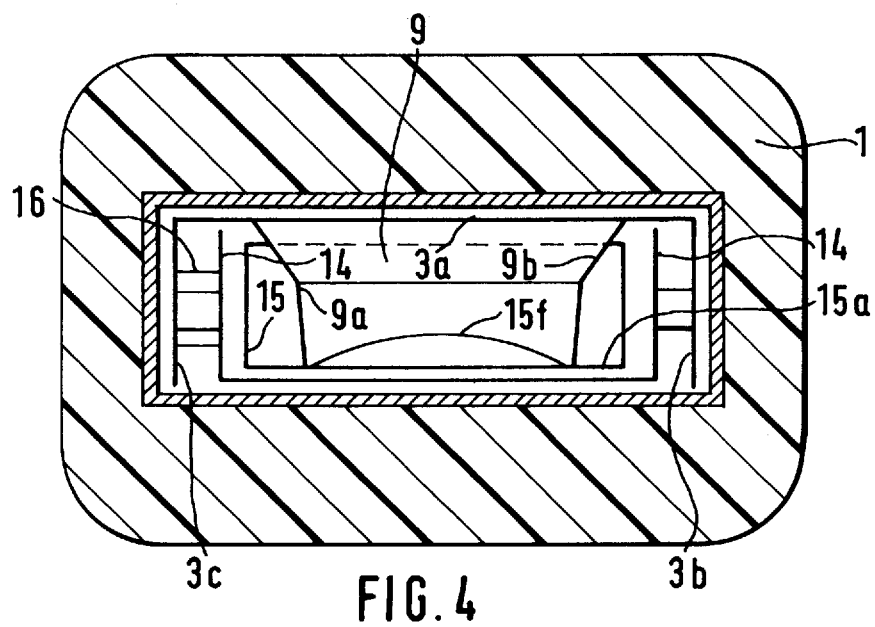
FIG. 4 shows a transverse section through the holding device according to the embodiment of FIG. 1 to FIG. 3, in the inner locked position.
Figure 3:
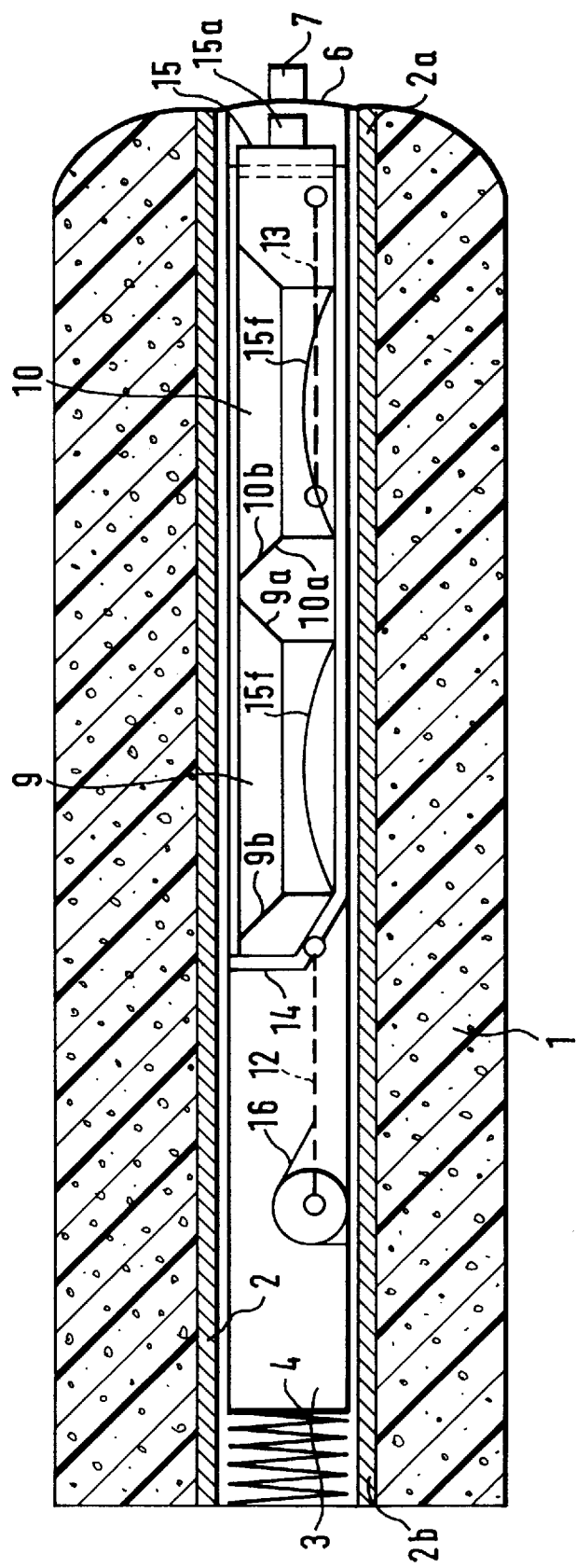
FIG. 3 shows a longitudinal section through the holding device according to the embodiment of FIG. 1 and FIG. 2, in the inner locked position.

FIGS. 1 to 4 shows a first embodiment of the holding device. The protective housing 2 in which the holder 3 is guided so that it is longitudinally displaceable is arranged in the arm rest 1.

A spring 4 is arranged between the protective housing 2 and the holder 3. On release of the locking mechanism 5 by means of the button 7 arranged on the front wall 6, it moves the holder 3 from the inner locked position into. The outer locked position, the ejection path is limited by the stop member 8 arranged on the protective housing 2.

The holder 3 has a U-shaped cross-section, which is formed by the top wall 3a and the two side walls 3b, 3c. At the front side, the holder 3 is covered by the front wall 6. It closes off the opening in the protective housing 2 when the holder 3 is in its inner locked position.

The two ring-shaped openings 9, 10 for receiving the liquids containers 11 are arranged in the top wall 3a of the holder 3. The height of the supporting surfaces 9a, 10a of the openings 9, 10 corresponds substantially to the height of the side walls 3b, 3c of the holder 3. The supporting surfaces are provided at their upper end with lead-in slopes 9b, 10b, whilst at their lower ends 9c, 10c they are open.

The carrier 14 in which the drip tray 15 is mounted so that it is longitudinally displaceable is hinged on the holder 3 by way of swivel arms 12, 13.

The swivel arms 12, 13 are rotatably mounted on the insides of the side walls 3b, 3c of the holder 3 and on the outsides of the side walls 14b, 14c of the carrier 14.

The drip tray 15 has a bottom wall 15a, side walls 15b, 15c and a rear wall 15d and a front wall 15e. Their heights of which substantially correspond to the heights of the side walls 3b, 3c and of the front wall 6 of the holder 3.

In the outer locked position, the carrier 14, together with the drip tray 15, is lowered under the action of the leg spring 16 to a position below the holder 3. Therefore the drip tray 15 can be pulled out of the carrier 14 from beneath the front wall 6 by the handle 15a for cleaning purposes, and can be pushed into the carrier 14.

Supports 15f which support the liquids containers 11 placed in the holder 3 at a distance from the bottom wall 15a are arranged on the bottom wall 15a of the drip tray 15. This prevents the liquids containers 11 becoming dirty through contact with the liquid which has collected in the drip tray 15.

As the holder 3 is pushed from the outer locked position into the inner locked position, the two swivel arms 12 ride up onto the front edge 2a of the bottom wall 2b of the protective housing 2 and are pressed upwards against the force of the leg spring 16. The carrier 14, together with the drip tray 15, is therefore folded from below into the holder 3 and the side walls 14b, 14c of the carrier 14. Also the side walls 15b, 15c and the rear wall 15d and front end wall 15e of the drip tray 15 are inserted into the cavities of the holder 3 bounded by the side walls 3b, 3c and the front wall 6 and the supporting surfaces 9a, 10a.

Figure 5:
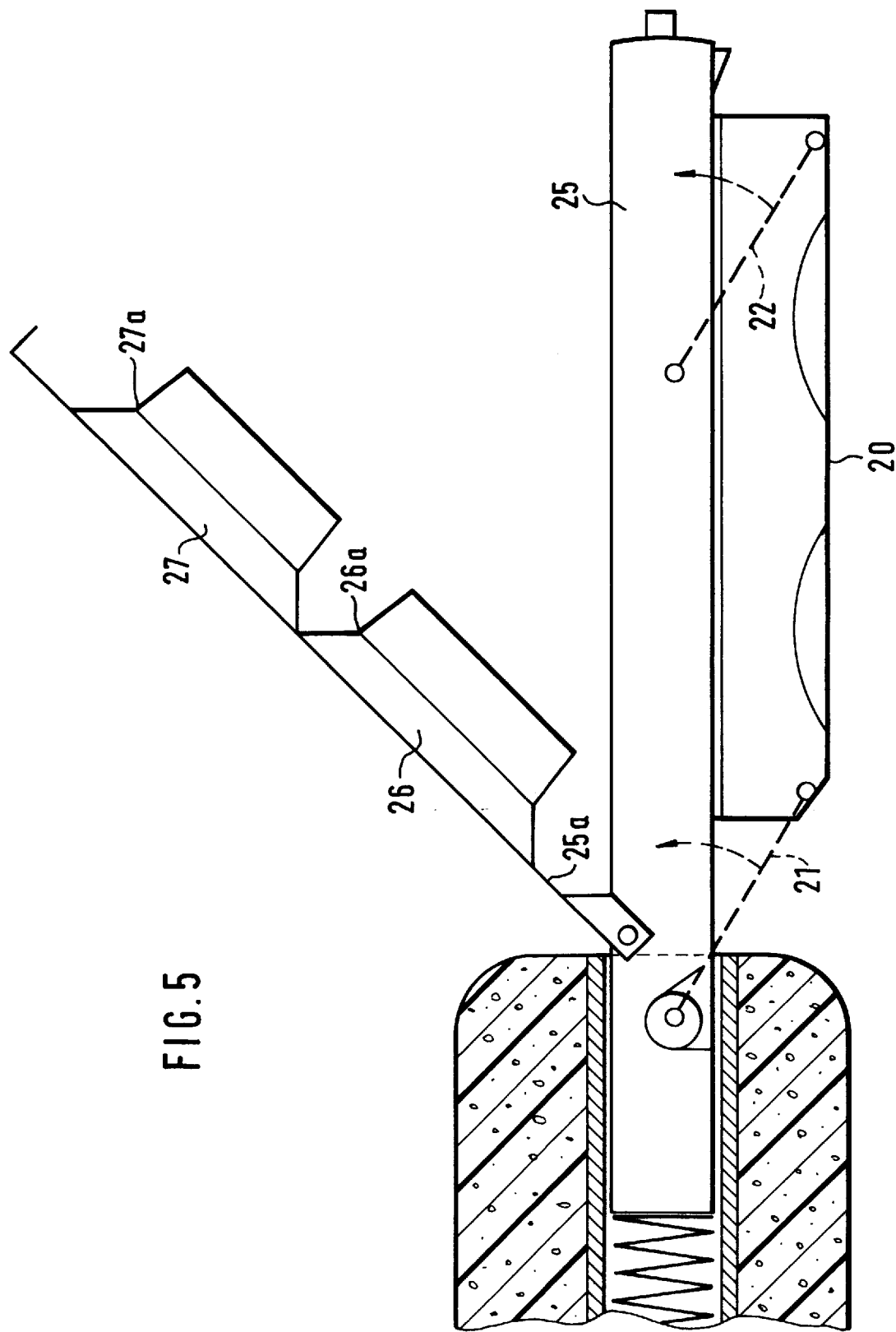
FIG. 5 shows a longitudinal section through a second embodiment of the holding device, in the outer locked position.

FIG. 5 shows an alternative embodiment in which the drip tray 20 is directly hinged to the holder 25 by way of the swivel arms 21, 22. To clean the drip tray 20, the cover 25a, which is rotatably hinged to the holder 25 and on which also the supporting surfaces 26a, 27a of the ring-shaped openings 26, 27 are arranged, can be folded upwards.

Alternatively, it would, of course, also be possible in this construction for the drip tray 20 to be connected by way of a carrier to the holder 25 and to be taken in an upward direction out of the holding device for cleaning.

Figure 6:
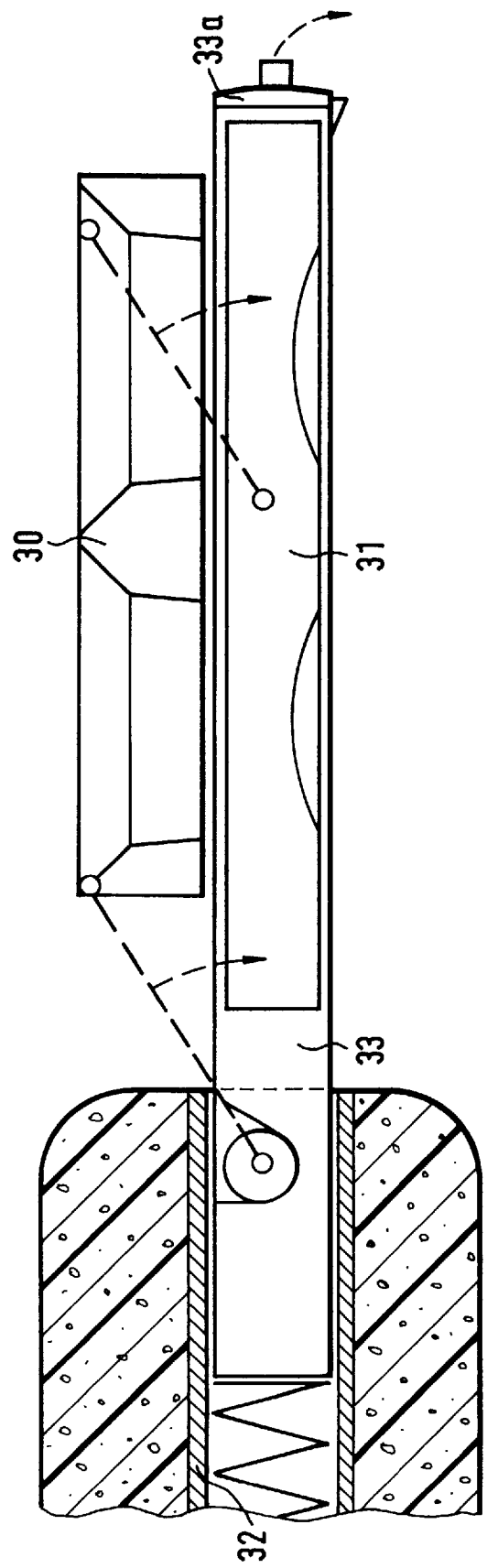
FIG. 6 shows a longitudinal section through a third embodiment of the holding device in the outer locked position.

FIG. 6 shows a further embodiment. In this embodiment the outer locked position the holder 30 moves upwards out of the drip tray 31, which is inserted into the carrier 33 mounted in the protective housing 32.

By folding down the front wall 33a, the drip tray 31 can be pulled forwards out of the carrier 33.

It would, of course, also be possible in this embodiment to omit the carrier 33 and to guide the drip tray 31 such that it moves longitudinally directly in the protective housing 32. To clean the drip tray, for example, the holder 30 would then have to be folded upwards, as already shown in the embodiment according to FIG. 5.

I claim:

1. A holding device for substantially circular liquid containers adapted to be installed in motor vehicles, comprising a holder adapted to support a liquid container at its circumferential surface; a drip tray for collecting spilled liquid and adapted to be arranged under the liquid container and movably joined to said holder; a protective housing, said holder and said drip tray being movable between an inner locked position in which said holder and said drip tray are enclosed, nested into one another, in said protective housing, and an outer locked position in which said holder and said drip tray are sufficiently far apart to enable the liquid container to be placed in said holder, and a carrier which joins said drip tray with said holder, said holder having a top wall, said drip tray being arranged to be removed parallel to said top wall in a forward direction from said carrier and to be inserted into said carrier.

2. A holding device as defined in claim 1, wherein said holder is longitudinally displaceable in said protective housing.

3. A holding device as defined in claim 1, wherein said protective housing has an opening; and further comprising a front wall which is arranged at a front side of said holder and closes said opening of said protective housing when said holder is inserted.

4. A holding device as defined in claim 1, wherein said holder has side walls directed downwardly from said top wall.

5. A holding device as defined in claim 4, wherein said top wall has ring-shaped openings for receiving the liquid container.

6. A holding device as defined in claim 5; and further comprising downwardly directed supporting surfaces which are arranged in said openings and support the liquid container.

7. A holding device as defined in claim 1, wherein said drip tray has a bottom wall, side walls, a rear wall and a front wall.

8. A holding device as defined in claim 7, wherein said bottom wall of said drip tray has supports on which bottom surfaces of the liquid container are supportable.

9. A holding device as defined in claim 1, wherein when said holder is arranged in said outer locked position said holder swings upwards out of said drip tray.

10. A holding device as defined in claim 1; and further comprising a spring which effects a movement of said holder and said carrier with said drip tray out of said protective housing from said inner locked position into said outer locked position.

11. A holding device as defined in claim 1; and further comprising a releasable locking mechanism which fixedly holds said holder and said carrier in said protective housing.

12. A holding device as defined in claim 11; and further comprising a releasable locking mechanism which holds said holder and said drip tray in said protective housing.

13. A holding device as defined in claim 11; and further comprising a spring which effects a movement apart of said holder and said drip tray during ejection from said inner locked position into said outer locked position.

14. A holding device as defined in claim 11, wherein said protective housing has front edges formed so that nesting of said holder and said drip tray into one another during insertion into said protective housing is provided by running onto said front edges of said protective housing.

15. A holding device as defined in claim 11, wherein said protective housing has front edges formed so that nesting of said holder and said carrier into one another during insertion into said protective housing is effected by running onto said front edges of said protective housing.

16. A holding device as defined in claim 1, wherein said holder has cavities bounded by side walls of said holders a front wall and supporting surfaces, said carrier having side walls, said drip tray having side walls, a rear wall and a front wall, said side walls of said carrier and also said side walls, said rear wall and said front wall of said drip tray being foldable into said cavities.

17. A holding device for substantially circular liquid containers adapted to be installed in motor vehicles, comprising a holder adapted to support a liquid container at its circumferential surface; a drip tray for collecting spilled liquid and adapted to be arranged under the liquid container and movably joined to said holder; a protective housing, said holder and said drip tray being movable between an inner locked position in which said holder and said drip tray are enclosed, nested into one another, in said protective housing, and an outer locked position in which said holder and said drip tray are sufficiently far apart to enable the liquid container to be placed in said holder; a releasable locking mechanism which holds said holder and said drip tray in said protective housing; and a front wall provided with a button which unlocks said locking mechanism.

18. A holding device as defined in claim 17; and further comprising a carrier which joins said drip tray with said holder.

19. A holding device as defined in claim 18; and further comprising swivel arms which join said carrier and said holder so that said carrier and said holder are displaceable while remaining parallel.

20. A holding device as defined in claim 18, wherein said drip tray and said carrier are guided in said protective housing so as to be longitudinally displaceable.

21. A holding device for substantially circular liquid containers adapted to be installed in motor vehicles, comprising a holder adapted to support a liquid container at its circumferential surface; a drip tray for collecting spilled liquid and adapted to be arranged under the liquid container and movably joined to said holder; a protective housing, said holder and said drip tray being movable between an inner locked position in which said holder and said drip tray are enclosed, nested into one another, in said protective housing, and an outer locked position in which said holder and said drip tray are sufficiently far apart to enable the liquid container to be placed in said holder; and a fold-up cover which contains openings and is arranged on said holder.

22. A holding device as defined in claim 21, wherein said cover has supporting surfaces.

23. A holding device for substantially circular liquid containers adapted to be installed in motor vehicles, comprising a holder adapted to support a liquid container at its circumferential surface; a drip tray for collecting spilled liquid and adapted to be arranged under the liquid container and movably joined to said holder; a protective housing, said holder and said drip tray being movable between an inner locked position in which said holder and said drip tray are enclosed, nested into one another, in said protective housing, and an outer locked position in which said holder and said drip tray are sufficiently far apart to enable the liquid container to be placed in said holder, said holder having a top wall and side walls directed downwardly from said top wall, said top wall having ring-shaped openings for receiving the liquid container, said top wall of said holder having sloping surfaces which guide fluid into said openings.

24. A holding device for substantially circular liquid containers adapted to be installed in motor vehicles, comprising a holder adapted to support a liquid container at its circumferential surface; a drip tray for collecting spilled liquid and adapted to be arranged under the liquid container and movably joined to said holder; a protective housing, said holder and said drip tray being movable between an inner locked position in which said holder and said drip tray are enclosed, nested into one another, in said protective housing, and an outer locked position in which said holder and said drip tray are sufficiently far apart to enable the liquid container to be placed in said holder; and a carrier which joins said drip tray with said holder, said carrier having a fold-down front wall, said drip tray being movable forwards out of said carrier.

25. A holding device for substantially circular liquid containers adapted to be installed in motor vehicles, comprising a holder adapted to support a liquid container at its circumferential surface; a drip tray for collecting spilled liquid and adapted to be arranged under the liquid container and movably joined to said holder; a protective housing, said holder and said drip tray being movable between an inner locked position in which said holder and said drip tray are enclosed, nested into one another, in said protective housing, and an outer locked position in which said holder and said drip tray are sufficiently far apart to enable the liquid container to be placed in said holder; a carrier which joins said drip tray with said holder; a releasable locking mechanism which fixedly holds said holder and said carrier in said protective housing; and a front wall provided with a button which unlocks said locking mechanism.

26. A holding device for substantially circular liquid containers adapted to be installed in motor vehicles, comprising a holder adapted to support a liquid container at a circumferential surface of the liquid container; a drip tray for collecting spilled liquid and adapted to be arranged under the liquid container and movably joined to said holder; and a protective housing, said holder and said drip tray being movable between an inner locked position in which said holder and said drip tray are enclosed, nested into one another, in said protective housing, and an outer locked position in which said holder and said drip tray are sufficiently far apart to enable the liquid container to be placed in said holder; and a carrier which joins said drip tray with said holder, said holder being arranged so that in said outer locked position said holder swings upwardly out of said carrier.

27. A holding device for substantially circular liquid containers adapted to be installed in motor vehicles, comprising a holder adapted to support a liquid container at a circumferential surface of the liquid container; a drip tray for collecting spilled liquid and adapted to be arranged under the liquid container and movably joined to said holder; and a protective housing, said holder and said drip tray being movable between an inner locked position in which said holder and said drip tray are enclosed, nested into one another, in said protective housing, and an outer locked position in which said holder and said drip tray are sufficiently far apart to enable the liquid container to be placed in said holder; a carrier which joins said drip tray with said holder, and a spring which effects a movement apart of said holder and said carrier during rejection from said inner locked position into said outer locked position.

* * * * *